Figure 3:
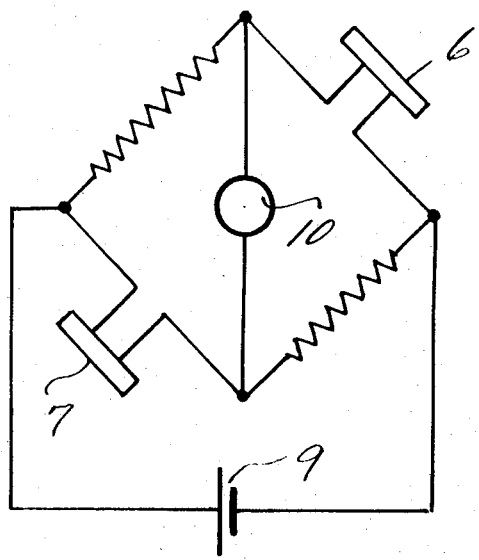

United States Patent

[11] 3,613,000

| [72] | Inventors | Robert James Weir;<br>Anthony David Hewitt, both of Norton-on-Tees, England |
|---|---|---|
| [21] | Appl. No. | 780,517 |
| [22] | Filed | Dec. 2, 1968 |
| [45] | Patented | Oct. 12, 1971 |
| [73] | Assignee | Imperial Chemical Industries Limited<br>London, England |
| [32] | Priority | Dec. 7, 1967 |
| [33] | | Great Britain |
| [31] | | 55766/67 |

[54] DEVICE FOR THE DETECTION OF THE ROTATIONAL MOTION OF A SHAFT
1 Claim, 3 Drawing Figs.

[52] U.S. Cl.................................................. 324/174, 324/46
[51] Int. Cl................................................... G01p 3/48

[50] Field of Search............................................ 324/69, 70, 46; 310/155, 168

[56]  References Cited
UNITED STATES PATENTS

| 2,924,633 | 2/1960 | Sichling.......................... | 324/46 |
| 3,229,202 | 1/1966 | Wenk............................. | 324/70 |
| 3,426,270 | 2/1969 | Reid.............................. | 324/46 |

FOREIGN PATENTS

| 1,008,147 | 10/1965 | Great Britain.................. | 324/70 |

Primary Examiner—Michael J. Lynch
Attorney—Cushman, Darby & Cushman

ABSTRACT: The rotational motion of a shaft having a magnetically detectable portion is detected using a device comprising a magnet, a magnetoresistor fixed relative to the magnet, and detection means to detect changes in the resistance of the magnetoresistor brought about by alterations in the field strength through the magnetoresistor as the shaft rotates.

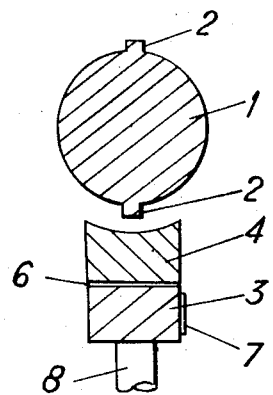
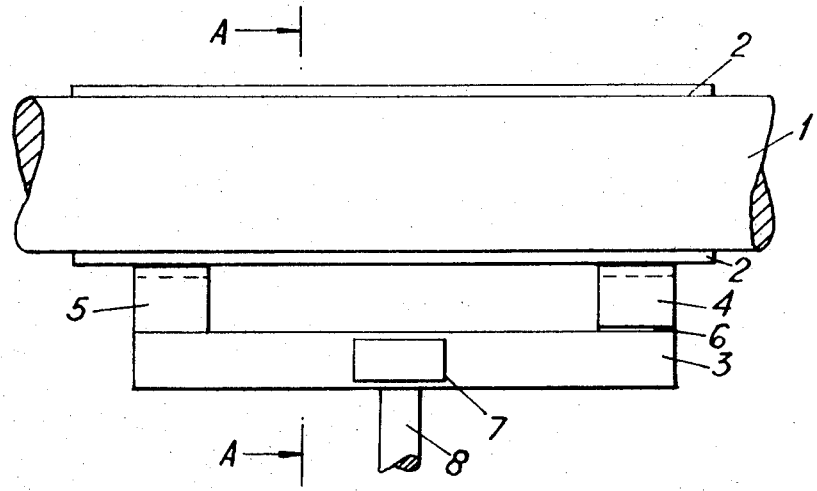

DEVICE FOR THE DETECTION OF THE ROTATIONAL MOTION OF A SHAFT

This invention is concerned with devices for detecting the rotational motion of a shaft.

Conventional detectors for the movement of a body make use of a change in intensity of a magnetic or electric field.

The most commonly employed detector comprises a magnet and a coil in which a current is developed in response to a change in the magnetic field in the coil. These detectors are used, in particular, for measuring the speed of rotating shafts by producing a pulse each time a portion of magnetically different material, e.g., a stud projecting from the shaft, moves past the detector. The pulse produced is, however, dependent upon the rate of change of the magnetic field. This imposes a speed limit for this type of detector in that the amplitude of the pulses must be sufficiently great to enable the pulses to be distinguished from spurious background signals. In addition, the inability of most practical detectors to provide sharp pulses tends to reduce the accuracy of the speed measurement at the higher speeds.

The use of inductive loads in potentially explosive atmospheres, such as may be found in chemical plants and refineries, is unsatisfactory from a safety point of view. A detector employing a coil wound on a magnet could be energized and even if only a small current energizes the coil there is a danger that when the circuit is broken a spark may be produced which will ignite the surrounding atmosphere.

The present invention is apparatus in which the disadvantages of the previously known devices are, or may be, reduced or eliminated.

This invention comprises a device for detecting rotational motion of a shaft, which device comprises a magnet, a magnetoresistor disposed within the magnetic field of the magnet and fixed relative to the magnet, detection means for detecting any change in the resistance of the magnetoresistor, and a magnetically detectable portion of a shaft, movable relative to the magnetic field by rotation of the shaft so as to change the magnitude of the field through the magnetoresistor.

The detection means for detecting any change in the resistance of the magnetoresistor may comprise means to detect changes in the current passing through the magnetoresistor in response to a potential difference applied across it, or means to pass a current through the magnetoresistor and to detect differences in potential across it. The magnetoresistor may very suitably be included in one arm of an impedance bridge network which becomes out of balance when the magnetically detectable portion of the shaft is sensed.

The shaft is normally made of ferromagnetic material. The magnetically detectable portion of the shaft may be of any type, such as a groove, or a plug of a material of different magnetic properties from those of the shaft inserted in the body of the shaft, or, alternatively, a stud or longitudinal ridge which projects from the end or surface of the shaft. The stud or ridge may be of a metal different from that of the shaft although it is convenient to use the same metal. Preferably two counterbalanced studs or ridges are used.

The effectiveness of the invention may be increased by situating the magnetoresistor in a gap in a substantially continuous circuit of ferromagnetic material which comprises a magnet and providing for a gap in the circuit to be at least partially closed by the passage of a ferromagnetic part into or close to the gap. The magnetoresistor may be situated in a single gap in a substantially continuous circuit of ferromagnetic material which gap is modified by the passage into or close to it of the magnetically detectable portion of the shaft. Suitably however the magnetoresistor is situated at the end of a magnet between and a pole piece which concentrates magnetic flux through the magnetically detectable portion of the shaft.

This may be achieved when, for example, the invention is to be used to sense the passage of a high permeability stud projecting from a shaft which rotates within a housing which at one point is spaced away from the shaft but which magnetically couples to the shaft at another point, for example, through bearings, by situating a probe comprising a magnet and a fixed magnetoresistor lying in the field of the magnet, between the casing and the shaft in such a position that, during rotation of the shaft, the stud at least partly fills the gap between the magnet and the shaft.

Substantially linear probes according to this invention may comprise a magnet, a pole piece to concentrate the field from the magnet, a magnetoresistor between the magnet and pole piece and preferably a nonmagnetic sleeve surrounding the magnet to protect it from damage. The protective sleeve may however be magnetic, for example a magnetic conductor or a cylindrical magnet. Preferably a second magnetoresistor similar to the first is mounted in a nonmagnetic position (for example in a central position with respect to the poles on the side of the magnet) and in good thermal communication with the first magnetoresistor. Alternatively two similar gaps may be provided in the magnetic circuit, a magnetoresistor may be situated in each gap and the magnetically detectable portion of the shaft may be caused to influence both magnetoresistors similarly and sequentially. These constructions allow the use of a bridge detector circuit including both of the magnetoresistors in which the one magnetoresistor compensates for the effect on the resistance of the other magnetoresistor of any thermal or magnet strength fluctuations occurring during the course of measurements. In the second of the constructions the bridge circuit gives two opposite signals as the magnetically detectable portion of the shaft passes the magnetoresistors.

Alternatively, when one or more ridges is employed, a magnet may be fixed in a position parallel to the ridge and clearing the path of the ridge by only a small margin. One or more magnetoresistors are situated in the gap between one or both poles of the magnet and the position of nearest approach of the ridge. Preferably pole pieces are provided between the poles and the position of nearest approach of the ridge.

The magnet may be an electromagnet or permanent magnet, but the use of a permanent magnet enables simpler systems to be adopted in which there is no inductive effect during variations in the magnetic field.

The signals produced by a device for detecting rotational motion of a shaft according to this invention may be counted to give a cumulative total of rotations of the shaft, or the rate of rotation or period of rotation may be estimated. A method of shaft overspeed detection which may be used in connection with this invention wherein the period between successive signals is compared with a standard time interval, is disclosed in our British Pat. specification No. 1,099,928.

The invention has the attractive feature that the magnitude of the signal given in the presence of the ferromagnetic part is independent of its speed of movement.

A specific device according to the invention will now be described with reference to the drawing accompanying the provisional specification, in which FIG. 1 represents a cross-sectional view on the line A—A of FIG. 2 and FIG. 2 is an elevation, though the invention is not limited thereto.

FIG. 3 illustrates an embodiment in which two magnetoresistors are connected in an impedance bridge.

A steel machine shaft 1 is provided with two counterbalanced steel ridges 2 on its periphery and lying parallel to its axis of rotation.

A bar magnet 3 lying parallel to the axis of rotation is provided with two short parallel pole pieces 4 and 5 directed towards the axis of the shaft and which just clear the ridges when the shaft rotates. Between one of the pole pieces 4 and the magnet 3 is situated a magnetoresistor 6. The faces of the pole pieces 4 and 5 facing the shaft are slightly concave, the axis of the curvature of the faces being coincident with the axis of the shaft. A second magnetoresistor 7 is secured by an adhesive layer to a central position on the side of the magnet and an aluminum rod 8 secured to a central position on the face of the magnet remote from the shaft serves firmly to hold the magnet in position.

Electrical wires (not shown) from both magnetoresistors pass to a resistance bridge network in which the magnetoresistors are connected so as to eliminate the effect of thermal fluctuations.

On each rotation of the shaft, two ridges 2 pass into the gap between the pole piece 4 and the shaft 1. Thus the resistance of the magnetoresistor between the pole piece and the magnet changes twice per revolution and the bridge network is twice put out of balance.

The output of the bridge network is fed to a device according to British Pat. specification No. 1,099,928 which compares the period between successive signals with a standard time interval and thus gives an indication if the shaft runs at over a desired speed. In FIG. 3, the two magnetoresistors 6 and 7 are shown connected in a bridge network which also includes a galvometer 10 and voltage source 9.

We claim:

1. A device for detecting rotational motion which comprises; a rotatable shaft, a permanent magnet, first means including said magnet forming a substantially continuous circuit of ferromagnetic material positioned adjacent said shaft, two ferromagnetic elements mounted on said shaft and being disposed diametrically opposite to each other, movement of said elements with said shaft relative to said first means being effective to vary the magnetic field through said first means, a first magnetoresistor situated in a gap in said first means and responsive to the magnetic field therethrough, a second magnetoresistor mounted on said first means in thermal communication with said first magnetoresistor, said second magnetoresistor being positioned to be unresponsive to the magnetic field through said first means, impedance bridge network means including said first and second magnetoresistors in opposite arms thereof so that the output of said bridge network means is not effected by temperature variations, and detection means connected to said bridge network means for sensing unbalance therein caused by rotation of said shaft.